United States Patent
Hsueh et al.

(10) Patent No.: US 8,557,927 B2
(45) Date of Patent: Oct. 15, 2013

(54) COMB-SHAPED GRAFT COPOLYMERS AND METHODS OF MANUFACTURING THE SAME

(75) Inventors: Mao-Lin Hsueh, Pingtung County (TW); Cheng-Wei Yeh, Pingtung County (TW); Yi-Zhen Chen, Yilan County (TW); Kuo-Chen Shih, Kaohsiung (TW)

(73) Assignee: Industrial Technology Research Institute, Hsinchu (TW)

( * ) Notice: Subject to any disclaimer, the term of this patent is extended or adjusted under 35 U.S.C. 154(b) by 44 days.

(21) Appl. No.: 13/466,231

(22) Filed: May 8, 2012

(65) Prior Publication Data

US 2013/0165592 A1 Jun. 27, 2013

(30) Foreign Application Priority Data

Dec. 22, 2011 (TW) .............................. 100147905 A

(51) Int. Cl.
*C08F 265/06* (2006.01)

(52) U.S. Cl.
USPC ........... 525/301; 525/259; 525/263; 525/264; 525/265; 525/330.5; 526/220; 546/112; 546/141; 564/301; 564/300; 548/542

(58) Field of Classification Search
USPC .............. 525/259, 263, 264, 265, 301, 330.5; 526/220; 546/112, 141; 564/301, 300; 548/542
See application file for complete search history.

(56) References Cited

U.S. PATENT DOCUMENTS

| | | | | |
|---|---|---|---|---|
| 4,581,429 A | * | 4/1986 | Solomon et al. | 526/220 |
| 5,945,492 A | * | 8/1999 | Robert | 526/219.2 |
| 2002/0183473 A1 | | 12/2002 | Matyjaszewski et al. | |
| 2004/0110893 A1 | * | 6/2004 | Matyjaszewski et al. | 524/556 |
| 2010/0240827 A1 | | 9/2010 | Barwick et al. | |

FOREIGN PATENT DOCUMENTS

| | | |
|---|---|---|
| EP | 0 281 095 A2 | 9/1988 |
| EP | 1 227 113 A1 | 7/2002 |
| EP | 1 464 674 A2 | 10/2004 |
| GB | 975421 | 11/1964 |

OTHER PUBLICATIONS

Desimone, et al., Homogeneous and Multiphase Poly(Methyl Methacrylate) Graft Polymers Via the Macromonomer Method, Makromol. Chem. Macromol. Symp. 32, 1990, pp. 21-45.

Teng, et al., "High Glass Transistion Temperatures of Poly(Methyl Methacrylate) Prepared by Free Radical Initiators", Journal of Polymer Science: Part A: Polymer Chemistry, vol. 47, 2009, pp. 315-317.

* cited by examiner

*Primary Examiner* — Mark Kaucher
(74) *Attorney, Agent, or Firm* — Birch, Stewart, Kolasch & Birch, LLP

(57) ABSTRACT

The disclosed is a comb-shaped graft copolymer, including a back bone of PMMA and side chains of a random copolymer, a block copolymer, or a homopolymer polymerized of a monomer having a carbon-carbon double bond. The monomer can be alkyl acrylate, styrene, and the likes. The side chains terminal is grafted to a nitro-oxy compound.

11 Claims, No Drawings

COMB-SHAPED GRAFT COPOLYMERS AND METHODS OF MANUFACTURING THE SAME

CROSS REFERENCE TO RELATED APPLICATIONS

This application claims priority of Taiwan Patent Application No. 100147905, filed on Dec. 22, 2011, the entirety of which is incorporated by reference herein.

TECHNICAL FIELD

The technical field relates to a comb-shaped graft copolymer and methods of manufacturing the same.

BACKGROUND

A comb-shaped graft polymer (for example, acrylate polymer), having excellent physical properties such as impact resistance, thermal resistance, and toughness, is widely applied in several commercialized products. As known in the art, the comb-shaped graft polymer can be synthesized by many ways.

SUMMARY

One embodiment provides a comb-shaped graft copolymer, having a formula as below:

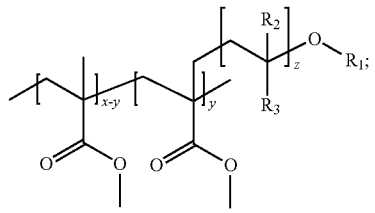

wherein $R_1$ is

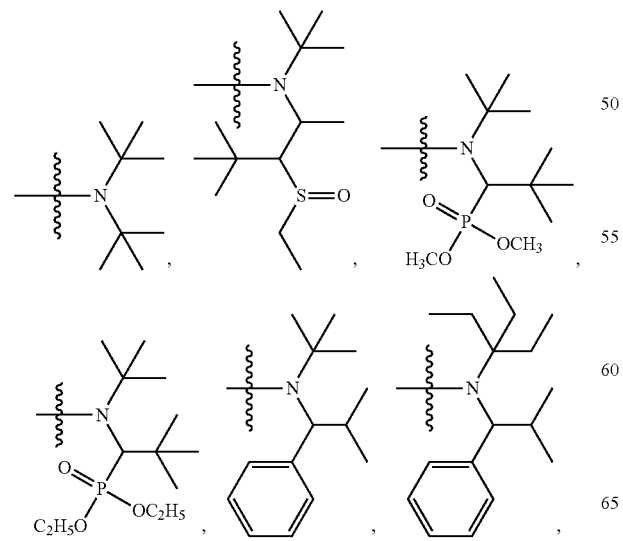

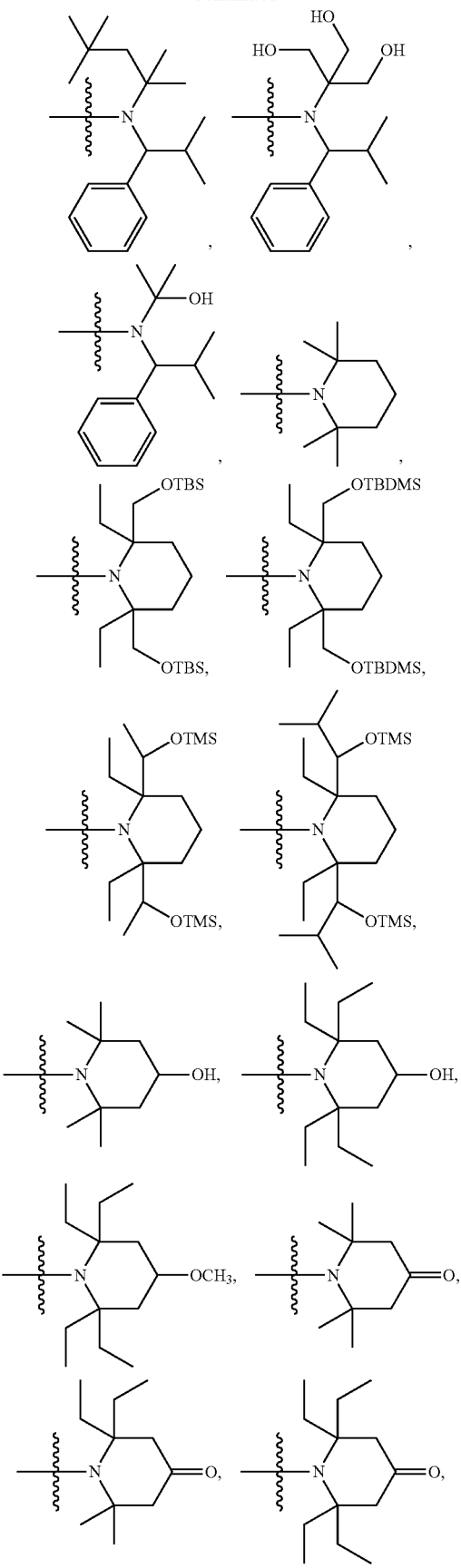

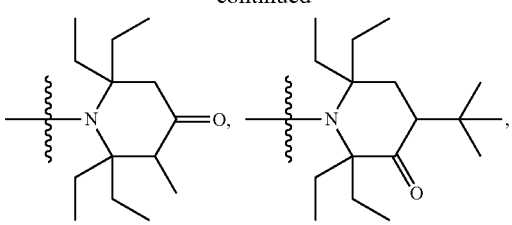
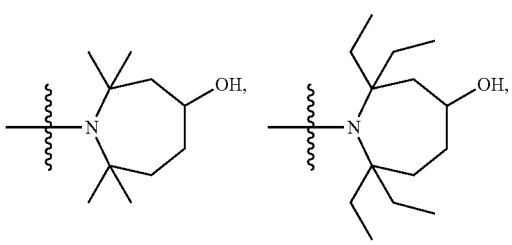
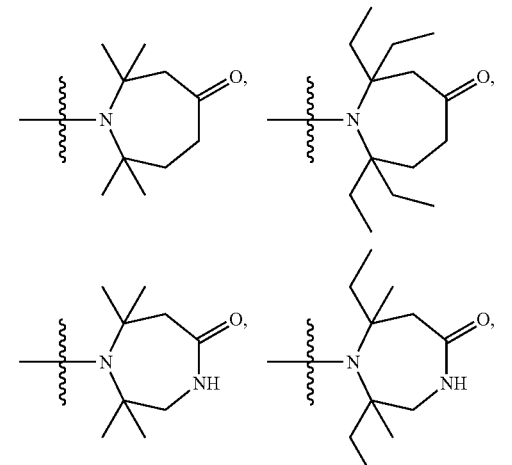
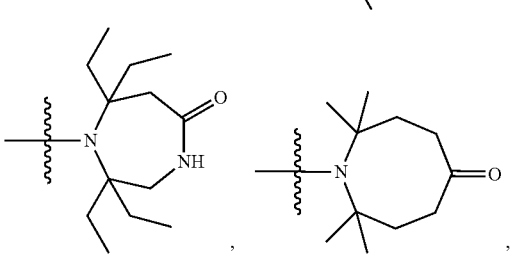

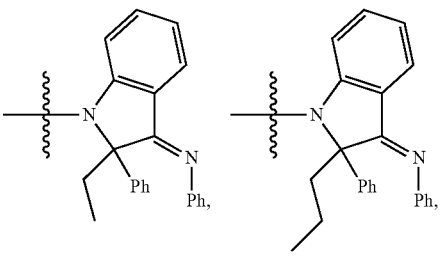
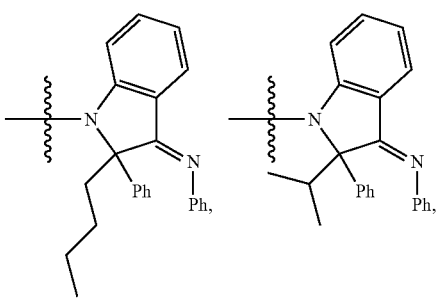
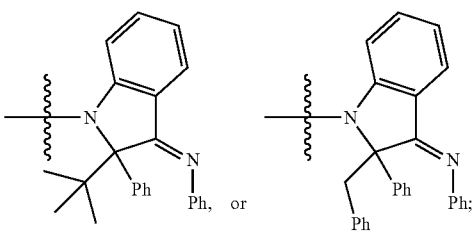
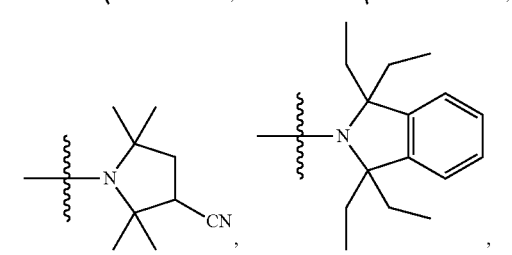
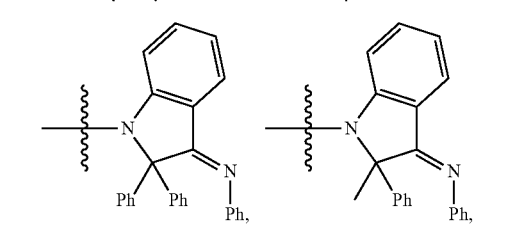

$R_2$ is hydrogen or a methyl group; $R_3$ is an ester group, an alkyl ester group, an aryl group, or a heteroaryl group; x is a repeating number of about 10 to $10^6$; y is a repeating number of about 10 to $10^3$; and z is a repeating number of about 10 to $10^5$.

One embodiment of the disclosure provides a method of forming a comb-shaped graft copolymer, comprising: heating a linear poly(methyl methacrylate), a peroxide free radical initiator, and a nitro-oxy compound to form a free radical macroinitiator; and heating the free radical macroinitiator and a monomer having a carbon-carbon double bond to form a comb-shaped graft copolymer; wherein the linear poly(methyl methacrylate) has a formula as below:

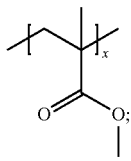

wherein the monomer having the carbon-carbon double bond has a formula as below:

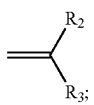

wherein the free radical macroinitiator has a formula as below:
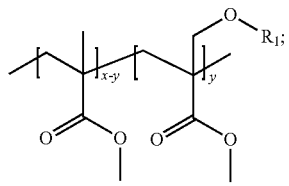
wherein the comb-shaped graft copolymer has a formula as below:
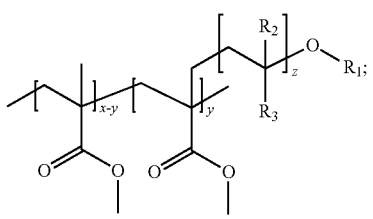
wherein $R_1$ is
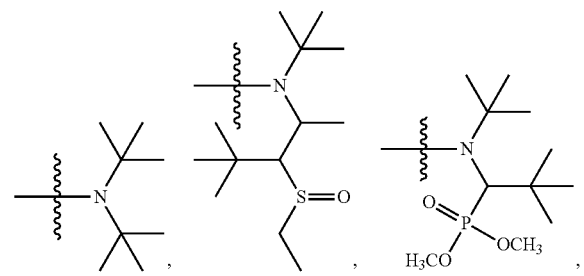
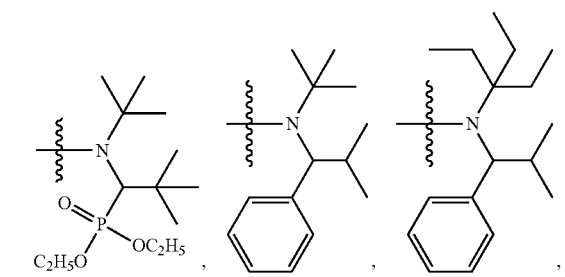
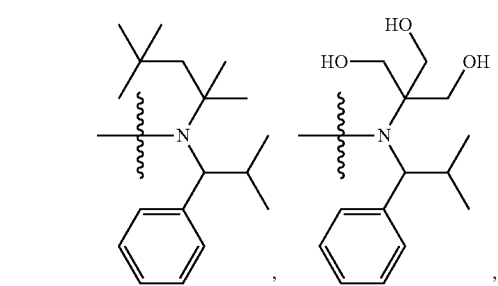
-continued
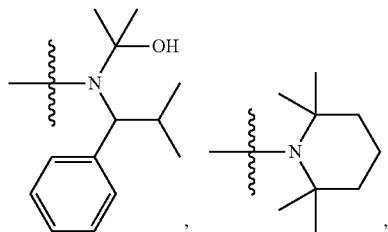
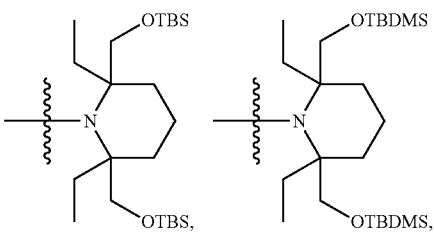
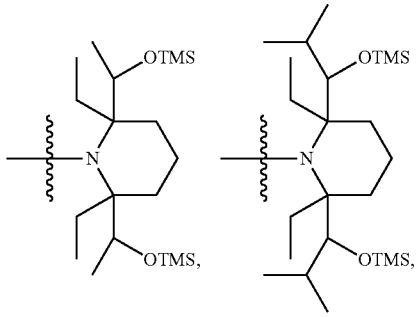
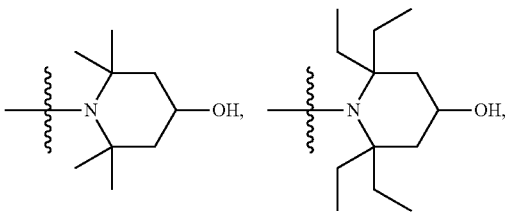
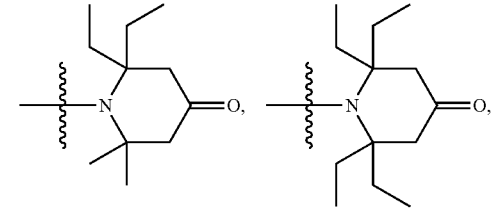
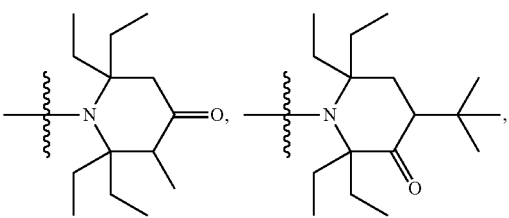

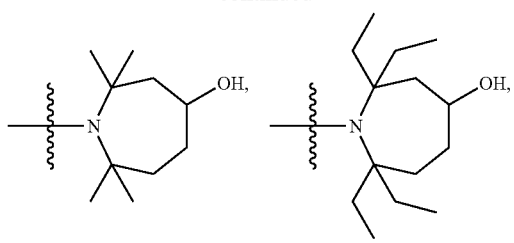
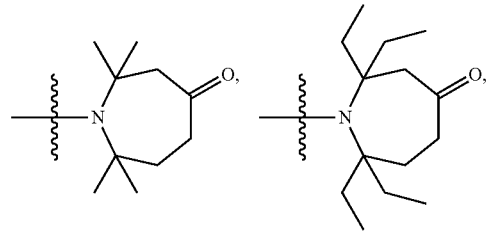
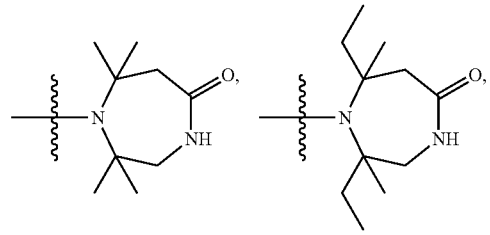
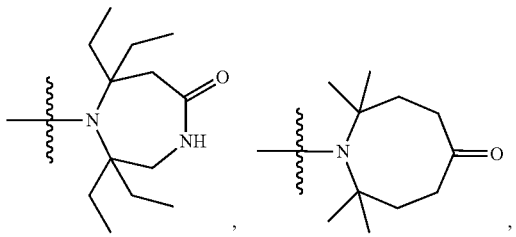
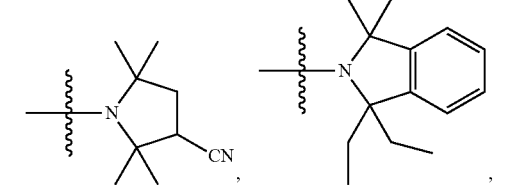
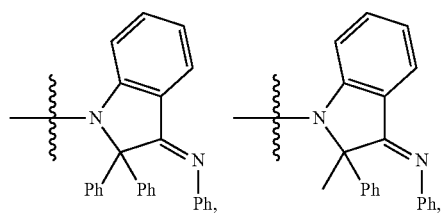
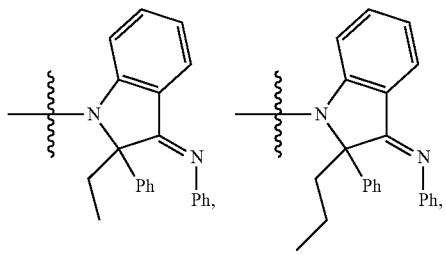

$R_2$ is hydrogen or a methyl group; $R_3$ is an ester group, an alkyl ester group, an aryl group, or a heteroaryl group; x is a repeating number of about 10 to $10^6$; y is a repeating number of about 10 to $10^3$; and z is a repeating number of about 10 to $10^5$.

A detailed description is given in the following embodiments with reference to the accompanying drawings.

DETAILED DESCRIPTION

Below, exemplary embodiments will be described in detail with reference to accompanying drawings so as to be easily realized by a person having ordinary knowledge in the art. The inventive concept may be embodied in various forms without being limited to the exemplary embodiments set forth herein. Descriptions of well-known parts are omitted for clarity, and like reference numerals refer to like elements throughout.

In one embodiment, the comb-shaped graft copolymer is formed as follows. First, a linear poly(methyl methacrylate) (PMMA, see Formula 1), a peroxide free radical initiator, and a nitro-oxy compound are heated for reacting to form a free radical macroinitiator (see Formula 2), as shown in Formula 3.

(Formula 1)
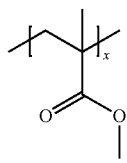

(Formula 2)
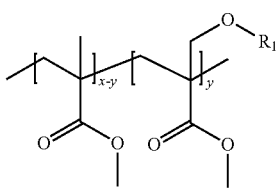

(Formula 3)

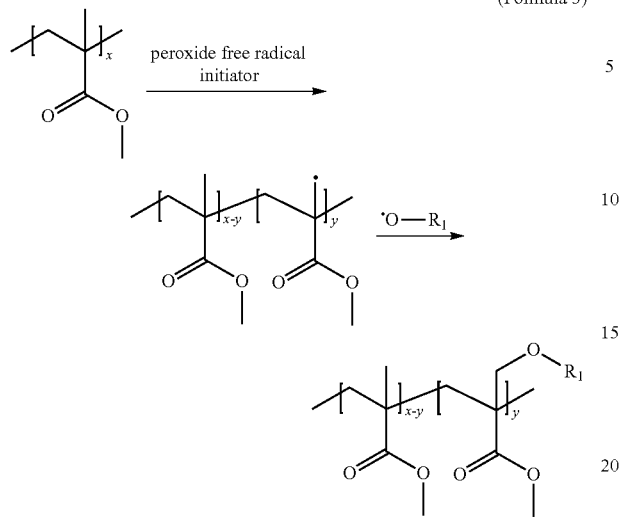

In Formula 1, x is a repeating number of about 10 to $10^6$. In Formula 2, x is a repeating number of about 10 to $10^6$, y is a repeating number of about 10 to $10^3$. In one embodiment, the reaction in Formula 3 is performed at a temperature of about 80° C. to 110° C., or about 90° C. to 100° C. In Formula 3, the peroxide free radical initiator is broken by heat to form free radicals, and the free radicals react with part of the methyl groups of the linear PMMA to form $CH_2$ free radicals. The $CH_2$ free radical further reacts with the nitro-oxy compound to form the free radical macroinitiator. In Formula 3, $R_1$ depends on the nitro-oxy compound and is any one of Formulae 7-1 to 7-40.

(Formula 7-1)

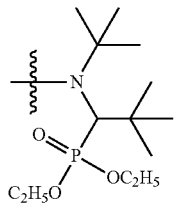

(Formula 7-2)

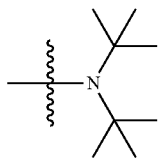

(Formula 7-3)

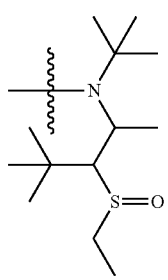

(Formula 7-4)

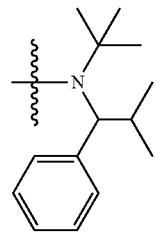

(Formula 7-5)

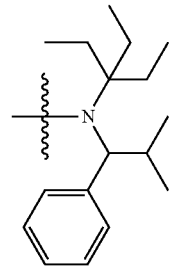

(Formula 7-6)

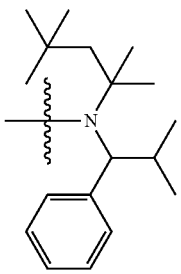

(Formula 7-7)

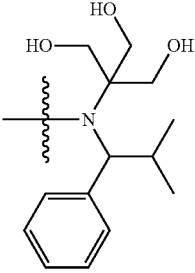

(Formula 7-8)

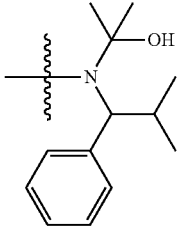

(Formula 7-9)

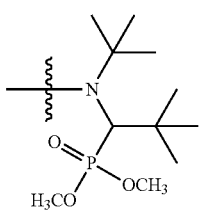

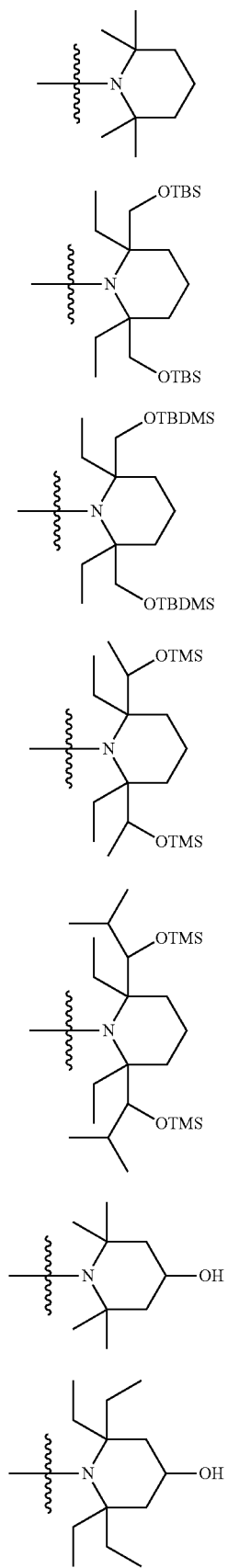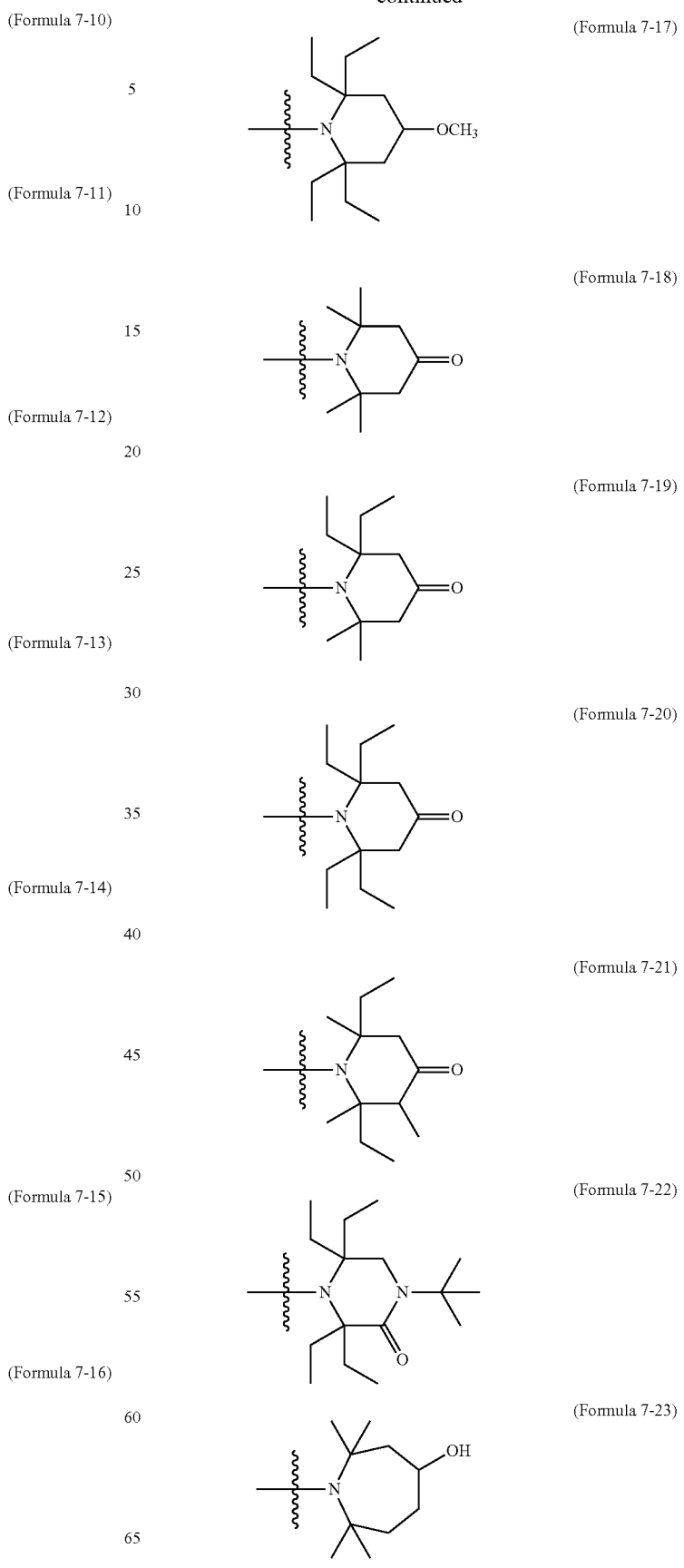

(Formula 7-24)
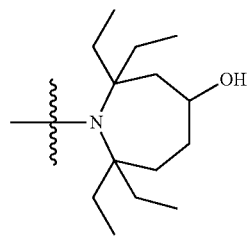
(Formula 7-25)
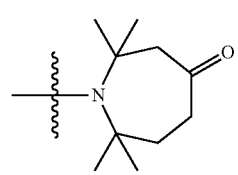
(Formula 7-26)
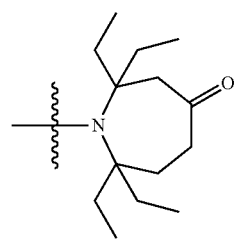
(Formula 7-27)
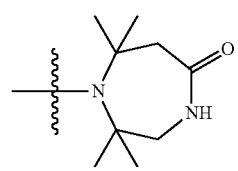
(Formula 7-28)
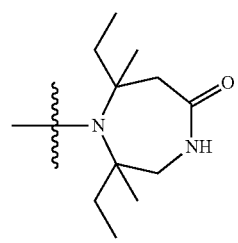
(Formula 7-29)
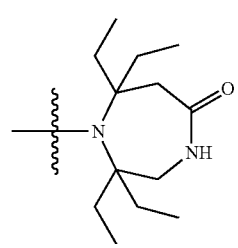
(Formula 7-30)
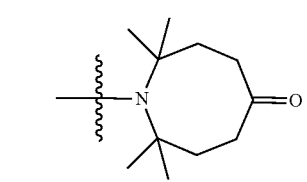
(Formula 7-31)
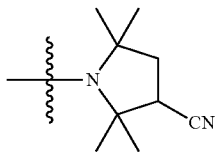
(Formula 7-32)
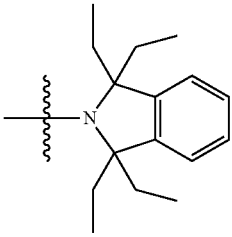
(Formula 7-33)
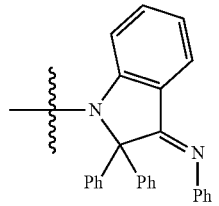
(Formula 7-34)
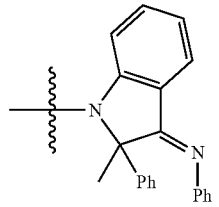
(Formula 7-35)
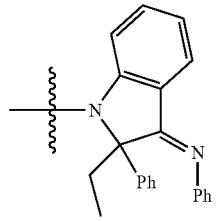
(Formula 7-36)
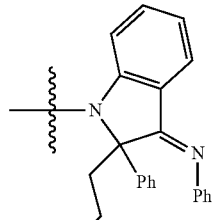
(Formula 7-37)
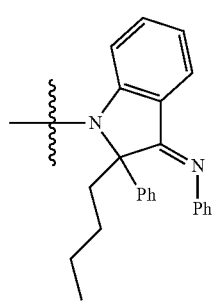

(Formula 7-38)

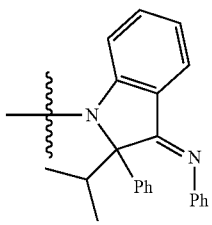

(Formula 7-39)

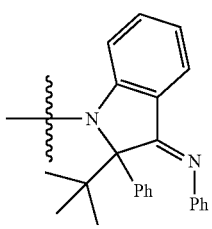

(Formula 7-40)

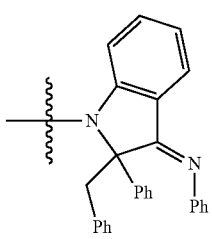

In Formula 7-11, TBS is a tributylsilanoxyethyl group. In Formula 7-12, TBDMS is a t-butyldimethylsilyl group. In Formulae 7-13 and 7-14, TMS is a trimethylsilanoxyethyl group.

In one embodiment, the peroxide free radical initiator includes di-t-butyl peroxide, t-butyl peroxybenzoate, or di-t-butyl peroxyoxalate.

It should be illustrated that the free radicals from the broken peroxide free radical initiator may react with the repeating unit in any position in the PMMA, such that the repeating units corresponding to the repeating number x-y (not reacting with the free radicals) and the repeating units corresponding to the repeating number y (reacting with the free radicals) may compose a random copolymer as shown in Formula 3.

The free radical macroinitiator (see Formula 2) and a monomer having a carbon-carbon double bond (see Formula 4) are then heated for reacting to form a comb-shaped graft copolymer (See Formula 5), as shown in Formula 6.

(Formula 4)

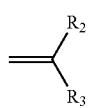

(Formula 5)

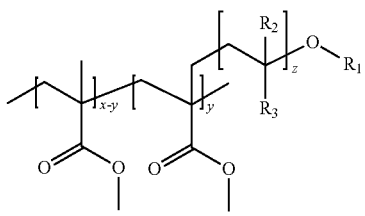

(Formula 6)

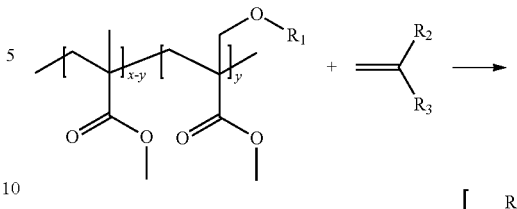

In Formula 4, $R_2$ is hydrogen or a methyl group, $R_3$ is an ester group, an alkyl ester group, an aryl group (e.g. a phenyl group), or a heteroaryl group. In formulae 5 and 6, z is a repeating number of about 10 to $10^5$. As shown in Formula 6, when the free radical macroinitiator is heated, the terminal C—O bond of the side chain will be broken to form a new radical to polymerize with the monomer having the carbon-carbon double bond. After the monomer having the carbon-carbon double bond is polymerized to form the side chain polymer, the terminal free radical will be combined with the nitro-oxy compound again. As such, the terminal of the side chain maintains its activity in the comb-shaped graft copolymer product. In other words, the comb-shaped graft copolymer product may further polymerize with a newly added monomer having a carbon-carbon double bond. It should be understood that if only one monomer having the carbon-carbon double bond is adopted, the repeating unit corresponding to the repeating number z will be the same, such that the side chain polymer with a nitro-oxy compound grafted on the terminal thereof should be a homopolymer. If at least two different monomers having the carbon-carbon double bond are added to the free radical macroinitiator, the repeating unit corresponding to the repeating number z will be a random copolymer copolymerized of the different monomers. If a first monomer having a carbon-carbon double bond is added to the free radical macroinitiator, and a second monomer having a carbon-carbon double bond is then added thereto after completely consuming the first monomer, a side chain of an A-B block copolymer will be formed. Thereafter, a side chain of an A-B-C block copolymer will be formed by adding a third monomer having a carbon-carbon double bond, and a side chain of an A-B-A copolymer will be formed by adding the first monomer having the carbon-carbon double bond, respectively. One skilled in the art may optionally select different monomers and the order for adding the monomers, to form different block copolymers. In one embodiment, the reaction in Formula 6 is performed at a temperature of about 130° C. to 150° C.

EXAMPLES

In following Examples, the molecular weight and molecular weight distribution was measured by a gel permeation chromatography (GPC) with a calibration curve of polystyrene (PS). The GPC solvent was a tetrahydrofuran (THF) solvent, the GPC equipment was a Waters 2414, the GPC columns were Column HR-1 and Column HR-4, the GPC detector was an RI Detector, and the solvent flow rate was 1.0 mL/min.

The glass transfer temperature (Tg) of the polymers was measured by a differential scanning calorimeter (DSC). The DSC equipment was a TA Q2000, and the nitrogen gas flow rate was 50 mL/min.

Example 1

Preliminary Treatment of the Linear PMMA

About 200 mL of dichloromethane was added to about 100 g of PMMA (CM205, commercially available from Chi-Mei, Mn=58,900) and stirred to dissolve the PMMA. The dichloromethane solution was added to 2 L of methanol to re-precipitate the PMMA. The re-precipitated PMMA was collected by filtering, and then dried in a vacuum oven at a temperature of 90° C. overnight, thereby obtaining a PMMA of the preliminary treatment (yield=90%) with a Tg of 110° C.

Example 2

Comb-Shaped Graft Copolymer of TEMPO Grafted on Linear PMMA (PMMA-g-TEMPO))

6.55 g of the PMMA of the preliminary treatment in Example 1 and 0.511 g of 2,2,6,6-tetramethyl-1-oxylpiperidine (3.27 mmol, TEMPO commercially available from Aldrich) were charged in a reaction bottle. 40 mL of deoxygenated toluene was then added into the reaction bottle under nitrogen. The reaction bottle was heated in an oil bath with a temperature of 90° C. to completely dissolve the PMMA and the TEMPO, and 0.39 g of di-t-butyl peroxide (DTBP, 2.67 mmol) was then injected into the reaction bottle. The solution in the bottle was stirred and reacted in the oil bath with a temperature of 95° C. overnight (18 hours), and then cooled to room temperature. The resulting solution was poured into 1 L of methanol to re-precipitate a solid, and the solid was collected and then dissolved by chloroform. The chloroform solution was then poured into 1 L of methanol to re-precipitate a solid, and the solid was collected, washed by methanol, and put into a vacuum oven with a temperature of 60° C. overnight. Finally, 5.9 g of a white solid product PMMA-g-TEMPO (yield=90%) was obtained, and its proton NMR spectrum was as follows: $^1$H NMR (CDCl$_3$, 400 MHz; δ ppm): 3.625 (s, —OCH$_2$—); 3.577 (s, —OCH$_3$); 2.038-1.729 (m, —CH$_2$); 1.189, 0.997, 0.810 (s, —CH$_3$).

Example 3

Graft Copolymer of TEMPO-OH Grafted on PMMA (PMMA-g-TEMPO-OH))

10.20 g of the PMMA of the preliminary treatment in Example 1 and 1.06 g of 4-hydroxyl-2,2,6,6-tetramethyl-1-oxylpiperidine (6.12 mole, TEMPO-OH commercially available from Aldrich) were charged in a reaction bottle. 40 mL of deoxygenated toluene was then added into the reaction bottle under nitrogen. The reaction bottle was heated in an oil bath with a temperature of 90° C. to completely dissolve the PMMA and the TEMPO-OH, and 0.74 g of DTBP (5.06 mmol) was then injected into the reaction bottle. The solution in the bottle was stirred and reacted in the oil bath with a temperature of 95° C. overnight (18 hours), and then cooled to room temperature. The resulting solution was poured into 1 L of methanol to re-precipitate a solid, and the solid was collected and then dissolved by chloroform. The chloroform solution was then poured into 1 L of methanol to re-precipitate a solid, and the solid was collected, washed by methanol, and put into a vacuum oven with a temperature of 60° C. overnight. Finally, 9.49 g of a white solid product PMMA-g-TEMPO-OH (yield=93%) was obtained, and its proton NMR spectrum was as follows: $^1$H NMR (CDCl$_3$, 400 MHz; δ ppm): 3.647 (s, —OCH$_2$); 3.599 (s, —OCH$_3$); 2.062-1.812, 1.636 (m, —CH$_2$); 1.213, 1.020, 0.848 (s, —CH$_3$).

Example 4

Comb-Shaped Graft Copolymer of PS Grafted on PMMA (PMMA-g-PS))

7.68 g of the PMMA-g-TEMPO prepared in Example 2 was charged in a reaction bottle, and 34 mL of deoxygenated polystyrene was then added into the reaction bottle under nitrogen. The reaction bottle was heated in an oil bath with a temperature of 130° C., and the mixture of the PMMA-g-TEMPO and the PS was stirred for 30 minutes to completely dissolve the PMMA-g-TEMPO in the PS. The solution was reacted at 130° C. for 8 hours, and then cooled to room temperature. 100 mL of dichloromethane was added to dissolve the resulting solid, and the dichloromethane solution was poured into 1 L of methanol to re-precipitate a solid, and the solid was collected and then dissolved by dichloromethane. The above re-precipitation process was then repeated for 2 times to collect a solid, and the solid was then put into a vacuum oven with a temperature of 90° C. Finally, 28.2 g of a white solid product PMMA-g-PS having a Tg of 110° C. and 126° C. was obtained, and its proton NMR spectrum was as follows: $^1$H NMR (CDCl$_3$, 400 MHz; δ ppm): 7.035, 6.561 (broad, ArH); 3.646 (s, —OCH—); 3.598 (s, —OCH$_3$); 2.063-1.673, 1.522 (m, —CH$_2$); 1.418 (broad, —CH$_2$); 1.212, 1.012, 0.836 (m, —CH$_3$).

Example 5

Comb-Shaped Graft Copolymer of PBA Grafted on PMMA (PMMA-g-PBA))

6.30 g of the PMMA-g-TEMPO prepared in Example 2 was charged in a reaction bottle, and 30 mL of deoxygenated xylene was then added into the reaction bottle under nitrogen. The reaction bottle was heated in an oil bath with a temperature of 90° C. to completely dissolve the PMMA-g-TEMPO in the xylene. Thereafter, 33 mL of deoxygenated butyl acrylate was added into the reaction bottle under nitrogen, and the solution was reacted at 130° C. for 18 hours, and then cooled to room temperature. 100 mL of dichloromethane was added to dissolve the resulting solid, and the dichloromethane solution was poured into 1 L of methanol to re-precipitate a liquid of high viscosity, and the liquid of high viscosity was collected and then dissolved by dichloromethane. The above re-precipitation process was then repeated for 2 times to collect a liquid of high viscosity, and the liquid of high viscosity was then put into a vacuum oven with a temperature of 110° C. Finally, 15.2 g of white liquid product PMMA-g-PBA having a Tg of −44° C. and 120° C. was obtained, and its proton NMR spectrum was as follows: $^1$H NMR (CDCl$_3$, 400 MHz; δ ppm): 4.037 (broad, —OCH$_2$—); 3.639 (s, —OCH—); 3.593 (s, —OCH$_3$); 2.268, 1.900 (broad, —CH$_2$); 1.585 (broad, —OCH$_2$CH$_2$CH$_2$CH$_3$); 1.366 (broad, —OCH$_2$CH$_2$CH$_2$CH$_3$); 1.207, 1.015 (m, —CH$_3$); 0.928 (t, —OCH$_2$CH$_2$CH$_2$CH$_3$); 0.830 (m, —CH$_3$).

Example 6

Comb-Shaped Graft Copolymer of PMMA Grafted on PMMA (PMMA-g-PMMA))

10.01 g of the PMMA-g-TEMPO-OH prepared in Example 3 was charged in a reaction vessel, and 350 mL of deoxygenated xylene and 41 mL of oxygenated methyl methacrylate was then added into the reaction vessel under nitrogen. The mixture in the reaction vessel was heated to 130° C. and stirred at a rotation speed of 500 rpm for 19 hours, and then cooled to room temperature. 100 mL of dichloromethane was added to dissolve the resulting solid, and the dichloromethane solution was poured into 3 L of methanol to re-precipitate a solid, and the solid was collected and then dissolved by dichloromethane. The above re-precipitation process was then repeated for 2 times to collect a solid, and the solid was then put into a vacuum oven with a temperature of 90° C. Finally, 22.5 g of white solid product PMMA-g-PMMA having a Tg of 127° C. was obtained, and its proton NMR spectrum was as follows: $^1$H NMR (CDCl$_3$, 400 MHz; δ ppm): 3.648 (s, —OCH—); 3.600 (s, —OCH$_3$); 2.169-1.814 (m, —CH$_2$); 1.214, 1.022, 0.837 (s, —CH$_3$).

In described Examples, the linear PMMA was modified to form comb-shaped graft copolymer. The back bone of the comb-shaped graft copolymer was polyacrylate, and different monomers were grafted on the back bone to form a side chain of a random copolymer or a block copolymer. The novel free radical modification of the disclosure may directly modify the linear PMMA. The poly(alkyl acrylate), the polystyrene, or copolymers thereof can be grafted on the backbone by the living free radical polymerization. The comb-shaped graft copolymers conveniently synthesized may have different side chains polymerized of different monomers, such that a product having different properties can be applied in a larger variety of different areas. In short, the comb-shaped graft copolymer has high potential for industry use.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A comb-shaped graft copolymer, having a formula as below:

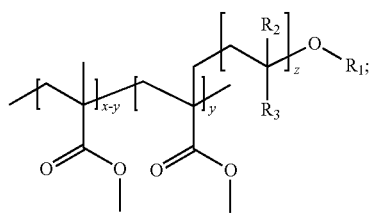

wherein R$_1$ is

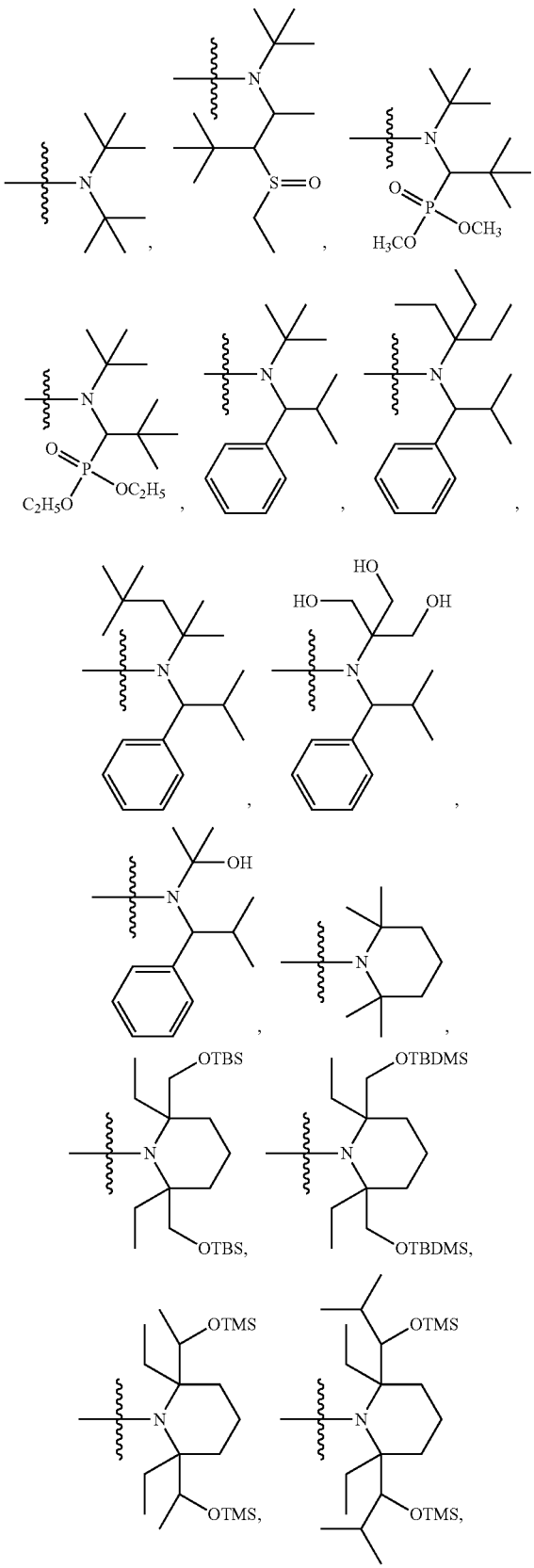

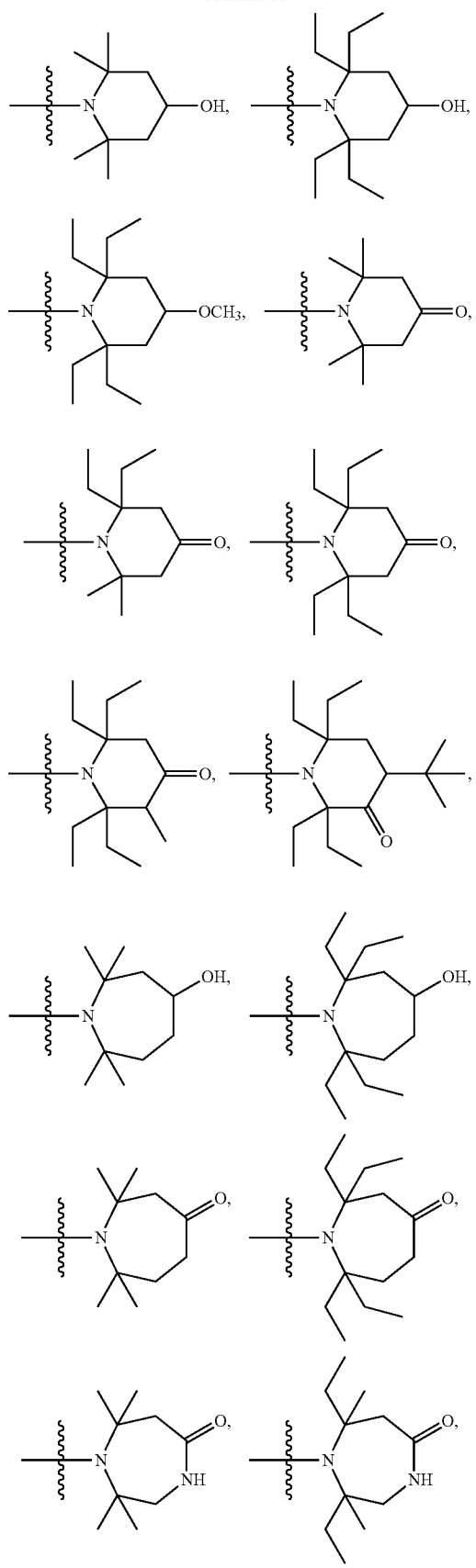

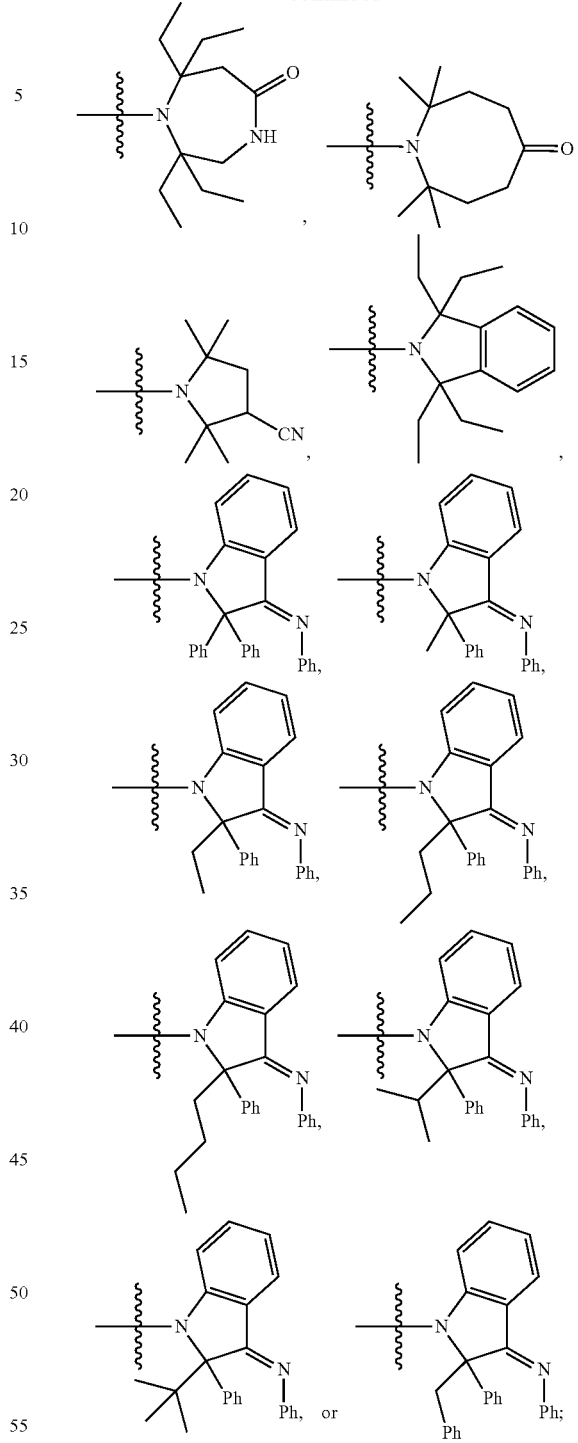

$R_2$ is hydrogen or a methyl group;
$R_3$ is an ester group, an alkyl ester group, an aryl group, or a heteroaryl group;
x is a repeating number of about 10 to $10^6$;
y is a repeating number of about 10 to $10^3$; and
z is a repeating number of about 10 to $10^5$.

2. The comb-shaped graft copolymer as claimed in claim 1, wherein the back bone composed of the repeating units corresponding to the repeating number x-y and the repeating number y is a random copolymer.

3. The comb-shaped graft copolymer as claimed in claim 1, wherein the repeating unit corresponding to the repeating number z includes only one repeating unit polymerized to form a homopolymer.

4. The comb-shaped graft copolymer as claimed in claim 1, wherein the repeating unit corresponding to the repeating number z includes at least two repeating units polymerized to form a random copolymer or a block copolymer.

5. A method of forming a comb-shaped graft copolymer, comprising:
   heating a linear poly(methyl methacrylate), a peroxide free radical initiator, and a nitro-oxy compound to form a free radical macroinitiator; and
   heating the free radical macroinitiator and a monomer having a carbon-carbon double bond to form a comb-shaped graft copolymer,
   wherein the linear poly(methyl methacrylate) has a formula as below:

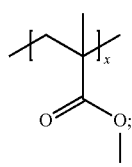

wherein the monomer having the carbon-carbon double bond has a formula as below:

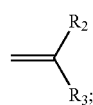

wherein the free radical macroinitiator has a formula as below:

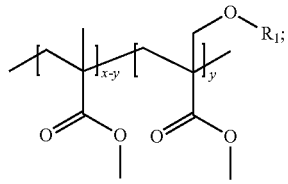

wherein the comb-shaped graft copolymer has a formula as below:

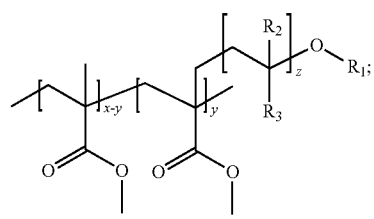

wherein $R_1$ is

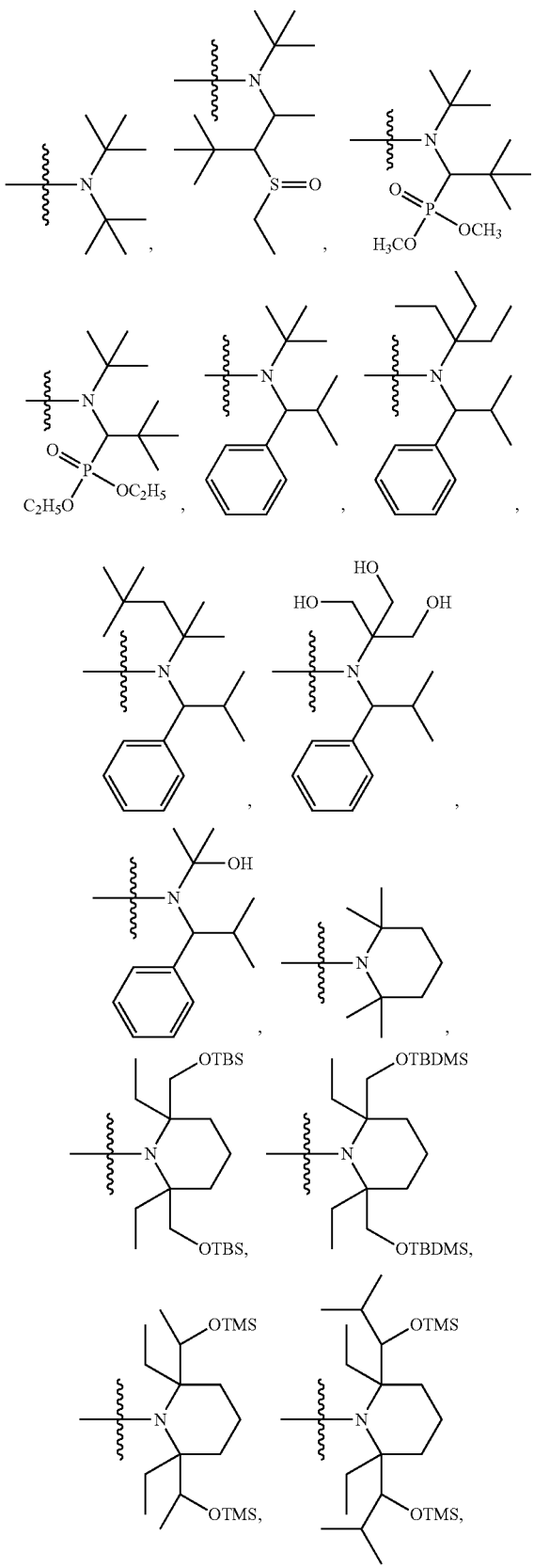

-continued

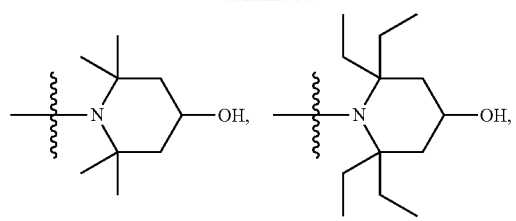
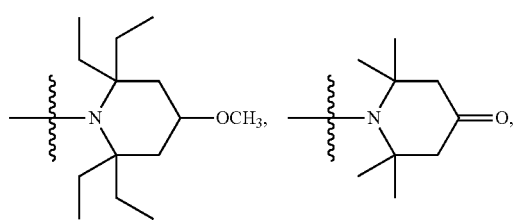
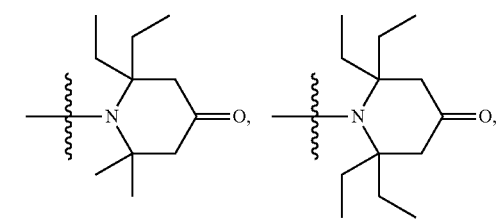
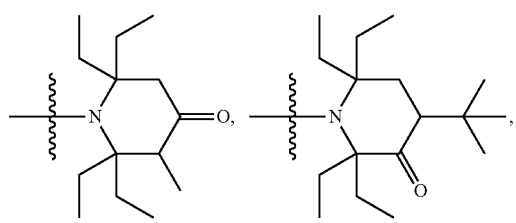
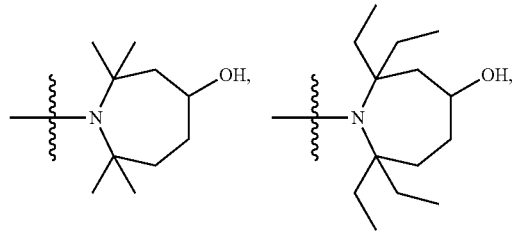
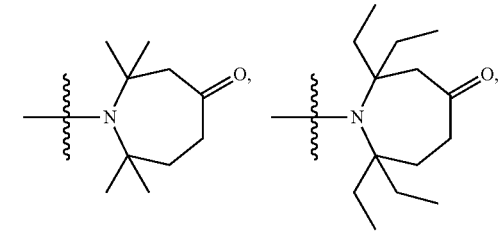
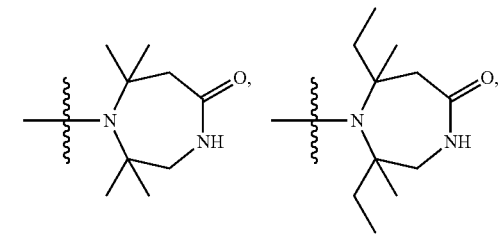

-continued

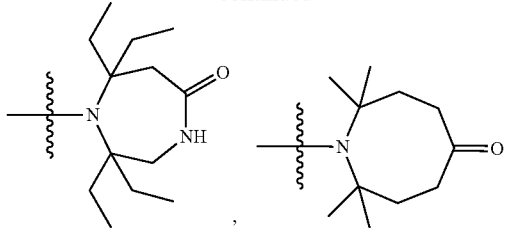
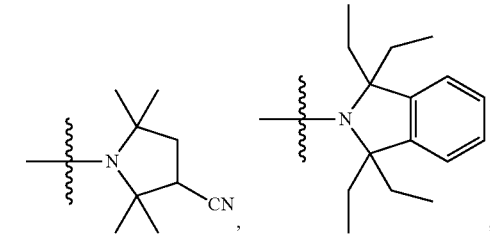
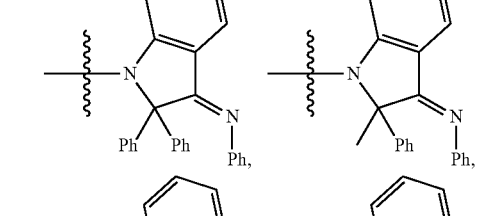
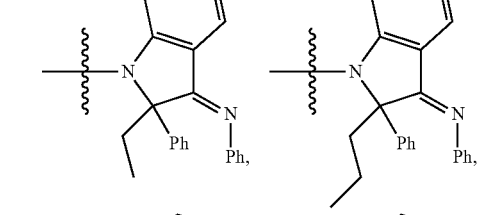
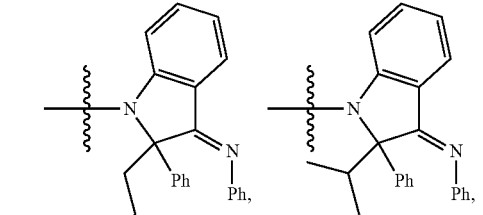
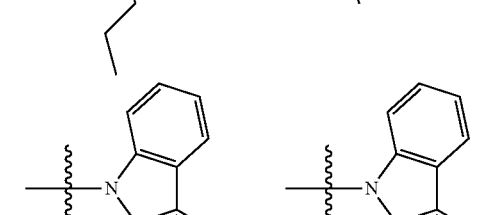
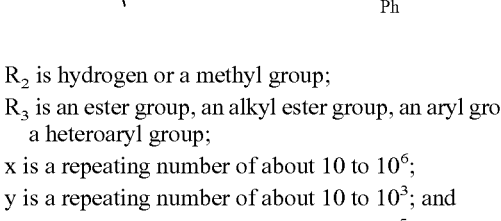

$R_2$ is hydrogen or a methyl group;

$R_3$ is an ester group, an alkyl ester group, an aryl group, or a heteroaryl group;

x is a repeating number of about 10 to $10^6$;

y is a repeating number of about 10 to $10^3$; and z is a repeating number of about 10 to $10^5$.

6. The method as claimed in claim 5, wherein the peroxide free radical initiator comprises di-t-butyl peroxide, t-butyl peroxybenzoate, or di-t-butyl peroxyoxalate.

7. The method as claimed in claim 5, wherein the step of heating the linear poly(methyl methacrylate), the peroxide free radical initiator, and the nitro-oxy compound to form the free radical macroinitiator is performed at a temperature of about 80° C. to 110° C.

8. The method as claimed in claim 5, wherein the step of heating the free radical macroinitiator and the monomer having a carbon-carbon double bond to form the comb-shaped graft copolymer is performed at a temperature of about 130° C. to 150° C.

9. The method as claimed in claim 5, wherein the back bone composed of the repeating units corresponding to the repeating number x-y and the repeating number y is a random copolymer.

10. The method as claimed in claim 5, wherein the repeating unit corresponding to the repeating number z includes only one repeating unit polymerized to form a homopolymer.

11. The method as claimed in claim 5, wherein the repeating unit corresponding to the repeating number z includes at least two repeating units polymerized to form a random copolymer or a block copolymer.

\* \* \* \* \*